United States Patent [19]
Anada et al.

[11] Patent Number: 5,677,897
[45] Date of Patent: Oct. 14, 1997

[54] APPARATUS FOR RECORDING AND REPRODUCING MAGNETO OPTICAL DISC

[75] Inventors: Satoru Anada; Takehiro Matsuda; Yoshihiro Ichikawa; Takahiro Miyagi; Atsushi Iitsuka; Shogo Sato, all of Tokorozawa, Japan

[73] Assignee: Pioneer Electronic Corporation, Tokyo-to, Japan

[21] Appl. No.: 773,611

[22] Filed: Dec. 30, 1996

Related U.S. Application Data

[63] Continuation of Ser. No. 405,849, Mar. 17, 1995, abandoned.

[30] Foreign Application Priority Data

Mar. 18, 1994  [JP]  Japan ..................... 6-073888

[51] Int. Cl.⁶ ..................... G11B 13/04; G11B 21/12
[52] U.S. Cl. ..................... 369/13; 369/77.2; 369/231; 369/244
[58] Field of Search ..................... 369/13, 75.1, 75.2, 369/77.1, 231, 244; 360/99.08, 114

[56] References Cited

U.S. PATENT DOCUMENTS 5,309,421  5/1994  Fujisawa ..................... 369/77.1
5,450,377  9/1995  Eom ..................... 369/13

FOREIGN PATENT DOCUMENTS 05-325296  12/1993  Japan .

*Primary Examiner*—Stuart S. Levy
*Assistant Examiner*—William J. Klimowicz
*Attorney, Agent, or Firm*—Kane, Dalsimer, Sullivan, Kurucz, Levy, Eisele and Richard, LLP

[57] ABSTRACT

A cartridge of write and read type or a cartridge of read only type is selectively loaded to a recording and reproducing apparatus. The recording and reproducing apparatus is provided with: a magnetic head for applying a magnetic field; a head movement device for moving the magnetic head between a near position and a far position; a switching lever, which is movable between a non-regulating position to allow the magnetic head to move between the near position and the far position, and a regulating position to regulate the position of the magnetic head at the far position; and a slide plate disposed movably on a cartridge holder and having a protruded portion which is opposed to the cartridge stored in the cartridge holder. The protruded portion abuts to the loaded cartridge to move the slide plate, and the switching lever is positioned at the non-regulating position by abutting to the moved slide plate if the loaded cartridge is the write and read type. The protruded portion is engaged with a judgement recess of the cartridge, and the switching lever is positioned at the regulating position if the loaded cartridge is the read only type.

10 Claims, 21 Drawing Sheets

APPARATUS FOR RECORDING AND REPRODUCING MAGNETO OPTICAL DISC

This application is a continuation of application Ser. No. 08/405,849, filed Mar. 17, 1995, now abandoned.

BACKGROUND OF THE INVENTION

1. Field of the Invention

The present invention generally relates to an apparatus for recording and reproducing an optical recording medium accommodated in a cartridge such as a magneto optical disc, and more particularly to a Judging mechanism for judging a cartridge loaded on the recording and reproducing apparatus is a cartridge for the write and read type medium or a cartridge for the read only type medium.

2. Description of the Related Art

There is a "mini-disc", as a magneto optical disc accommodated in a cartridge on the market, to which information can be written (recorded) and from which information can be read (reproduced).

For this mini-disc, the recording and reproducing operations are performed such that either one of a cartridge of write and read type, which accommodates a magneto optical disc of write and read type, and a cartridge of read only type, which accommodates a magneto optical disc of read only type, is selectively loaded on the recording and reproducing apparatus by the user, so that the recording operation and the reproducing operation are performed. At the time of recording, it is necessary to place a magnetic head at the vicinity of the optical disc. On the other hand, the magnetic head is not necessary for reproduction. Therefore, it is necessary to judge whether the loaded cartridge is the cartridge of write and read type or the cartridge of read only type, and to move the magnetic head toward and away from the optical disc in accordance with the judgement result.

This judgement as for the cartridge type is performed on the basis of an electric signal process in the above explained recording and reproducing apparatus.

However, in case that the judgement of the cartridge type is performed on the basis of the electrical signal process, if the judgement is erroneously performed due to a failure in a sensor, an electrical circuit etc., the recording and reproducing operations thereafter, may be seriously hindered. Namely, if the loaded cartridge is erroneously judged to be the cartridge of write and read type although the cartridge of read only type is actually loaded, and, in due course, if the user gives the apparatus a command to record information on the basis of this erroneous judgement result, the magnetic head is driven to move toward the optical disc accommodated in the loaded cartridge. However, the cartridge of read only type does not have an exposure opening to expose the accommodated optical disc with respect to the magnetic head therethrough. Thus, the magnetic head, which is moved toward the optical disc, may abut to the cartridge and may be damaged, which is a problem. Furthermore, the magnetic head is in such a condition that the magnetic head itself is able to be moved even if it is not necessary to move the magnetic head toward the optical disc since the cartridge of read only type is loaded on the reading and reproducing apparatus. Thus, the magnetic head may be moved to abut to the cartridge due to an external vibration or a shock.

SUMMARY OF THE INVENTION

It is therefore an object of the present invention to provide an apparatus for recording and reproducing an optical recording medium accommodated in a cartridge, such as a magneto optical disc, which can certainly judge whether the cartridge loaded on the apparatus is the cartridge of read only type or the cartridge of write and read type, and which can regulate the position of the movable magnetic head within an appropriate range depending on the judgement result.

The above object of the present invention can be achieved by a first recording and reproducing apparatus, to which one of a cartridge of write and read type and a cartridge of read only type is selectively loaded. The cartridge of write and read type accommodates a magneto optical disc of write and read type and is provided with a first judgement recess which has a first depth to indicate the write and read type. The cartridge of read only type accommodates a magneto optical disc of read only type and is provided with a second judgement recess which has a second depth deeper than the first depth to indicate the read only type. The first recording and reproducing apparatus is provided with: a base portion; an optical pickup unit disposed movably on the base portion and having an optical pickup for recording and reproducing the magneto optical disc of the loaded cartridge; a magnetic head for applying a magnetic field to the magneto optical disc of the loaded cartridge; and a head movement device for holding the magnetic head and moving the magnetic head between a near position and a far position. The near position is a position near the magneto optical disc of the loaded cartridge enough to apply the magnetic field of the magnetic head for recording thereto. The far position is a position too far from the magneto optical disc of the loaded cartridge to apply the magnetic field of the magnetic head for recording thereto. The first recording and reproducing apparatus is further provided with: a switching lever, which is disposed on the base portion and is movable between a non-regulating position to allow the magnetic head to move between the near position and the far position, and a regulating position to regulate the position of the magnetic head at the far position; a cartridge holder disposed movably on the base portion, for storing and carrying the loaded cartridge; and a slide plate disposed movably on the cartridge holder and having a protruded portion which is opposed to the cartridge stored in the cartridge holder. The protruded portion abuts to the loaded cartridge at the vicinity of the first judgement recess to move the slide plate, and the switching lever is positioned at the non-regulating position by abutting to the moved slide plate if the loaded cartridge is the write and read type. The protruded portion is engaged with the second judgement recess, and the switching lever is positioned at the regulating position if the loaded cartridge is the read only type.

According to the above described first recording and reproducing apparatus, if the cartridge of write and read type is loaded to the recording and reproducing apparatus, the protruded portion of the slide plate abuts to the loaded cartridge at the vicinity of the first judgement recess, so that the slide plate is moved with respect to the cartridge holder along with this movement of the loaded cartridge. Further, at this time, the switching lever abuts to the moved slide plate and is moved to be positioned at the non-regulating position. Thus, the magnetic head is now able to move between the near position and far position. Consequently, the magnetic head can be moved by the head movement device to the near position in accordance with the recording (writing) instruction, and can be moved to the far position in accordance with the reproducing (reading) instruction.

If the cartridge of read only type is loaded to the recording and reproducing apparatus, the protruded portion of the slide plate is engaged with the second judgement recess. Thus, the slide plate is not move with respect to the cartridge holder. Further, at this time, the switching lever does not abut to the slide plate and is positioned at the regulating position. Thus, the position of the magnetic head is regulated at the far position by the switching lever. Consequently, the magnetic head is positioned at the far position regardless of the erroneous recording (writing) instruction or the reproducing (reading) instruction, or even if there is an external vibration or shock applied to the recording and reproducing apparatus.

In one aspect of the first apparatus of the present invention, the first apparatus is further provided with an elastic member connected between the switching lever and the base portion for applying an elastic force to the switching lever in a direction toward the regulating position. Thus, the switching lever is stably positioned at the regulating position if the loaded cartridge is the read only type. In this case, the switching lever is preferably moved to be positioned at the non-regulating position by abutting to the moved slide plate against the elastic force of the elastic member.

In another aspect of the first apparatus of the present invention, the first apparatus is further provided with a spring member connected between the head movement device and the base portion for applying a spring force to the head movement device in a direction toward the far position. Thus, the head movement device is stably positioned at the far position if the loaded cartridge is the read only type.

The above object of the present invention can be also achieved by a second recording and reproducing apparatus, to which one of a cartridge of write and read type and a cartridge of read only type is selectively loaded. The cartridge of write and read type accommodates a magneto optical disc of write and read type and is provided with a first judgement recess which has a first depth to indicate the write and read type. The cartridge of read only type accommodates a magneto optical disc of read only type and is provided with a second judgement recess which has a second depth deeper than the first depth to indicate the read only type. The second recording and reproducing apparatus is provided with: a base portion; an optical pickup unit disposed movably on the base portion and having an optical pickup for recording and reproducing the magneto optical disc of the loaded cartridge; a magnetic head for applying a magnetic field to the magneto optical disc of the loaded cartridge; and a head movement device for holding the magnetic head and moving the magnetic head between a near position and a far position. The near position is a position near the magneto optical disc of the loaded cartridge enough to apply the magnetic field of the magnetic head for recording thereto. The far position is a position too far from the magneto optical disc of the loaded cartridge to apply the magnetic field of the magnetic head for recording thereto. The second recording and reproducing apparatus is further provided with: a switching lever, which is disposed on the base portion and is movable between a non-regulating position to allow the magnetic head to move between the near position and the far position, and a regulating position to regulate the position of the magnetic head at the far position; and a cartridge holder disposed movably on the base portion, for storing and carrying the loaded cartridge. The switching lever has a protruded portion which is opposed to the cartridge stored in the cartridge holder. The protruded portion of the switching lever abuts to the loaded cartridge at the vicinity of the first judgement recess to position the switching lever at the non-regulating position if the loaded cartridge is the write and read type. The protruded portion is engaged with the second judgement recess, and the switching lever is positioned at the regulating position if the loaded cartridge is the read only type.

According to the above described second recording and reproducing apparatus, if the cartridge of write and read type is loaded to the recording and reproducing apparatus, the protruded portion of the switching lever abuts to the loaded cartridge at the vicinity of the first judgement recess, so that the switching lever is moved to be positioned at the non-regulating position along with this movement of the loaded cartridge. Thus, the magnetic head is now able to move between the near position and far position. Consequently, the magnetic head can be moved by the head movement device to the near position in accordance with the recording (writing) instruction, and can be moved to the far position in accordance with the reproducing (reading) instruction.

If the cartridge of read only type is loaded to the recording and reproducing apparatus, the protruded portion of the switching lever is engaged with the second judgement recess. Thus, the switching lever is not moved but is positioned at the regulating position. Thus, the position of the magnetic head is regulated at the far position by the switching lever. Consequently, the magnetic head is positioned at the far position regardless of the erroneous recording (writing) instruction or the reproducing (reading) instruction, or even if there is an external vibration or shock applied to the recording and reproducing apparatus.

In one aspect of the second apparatus of the present invention, the second apparatus is further provided with an elastic member connected between the switching lever and the base portion for applying an elastic force to the switching lever in a direction toward the regulating position. Thus, the switching lever is stably positioned at the regulating position if the loaded cartridge is the read only type. In this case, the switching lever is preferably moved to be positioned at the non-regulating position by abutting to the loaded cartridge against the elastic force of the elastic member.

In another aspect of the second apparatus of the present invention, the second apparatus is further provided with a spring member connected between the head movement device and the base portion for applying a spring force to the head movement device in a direction toward the far position. Thus, the head movement device is stably positioned at the far position if the loaded cartridge is the read only type.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, embodiments of the present invention will be now explained.

Figure 1:
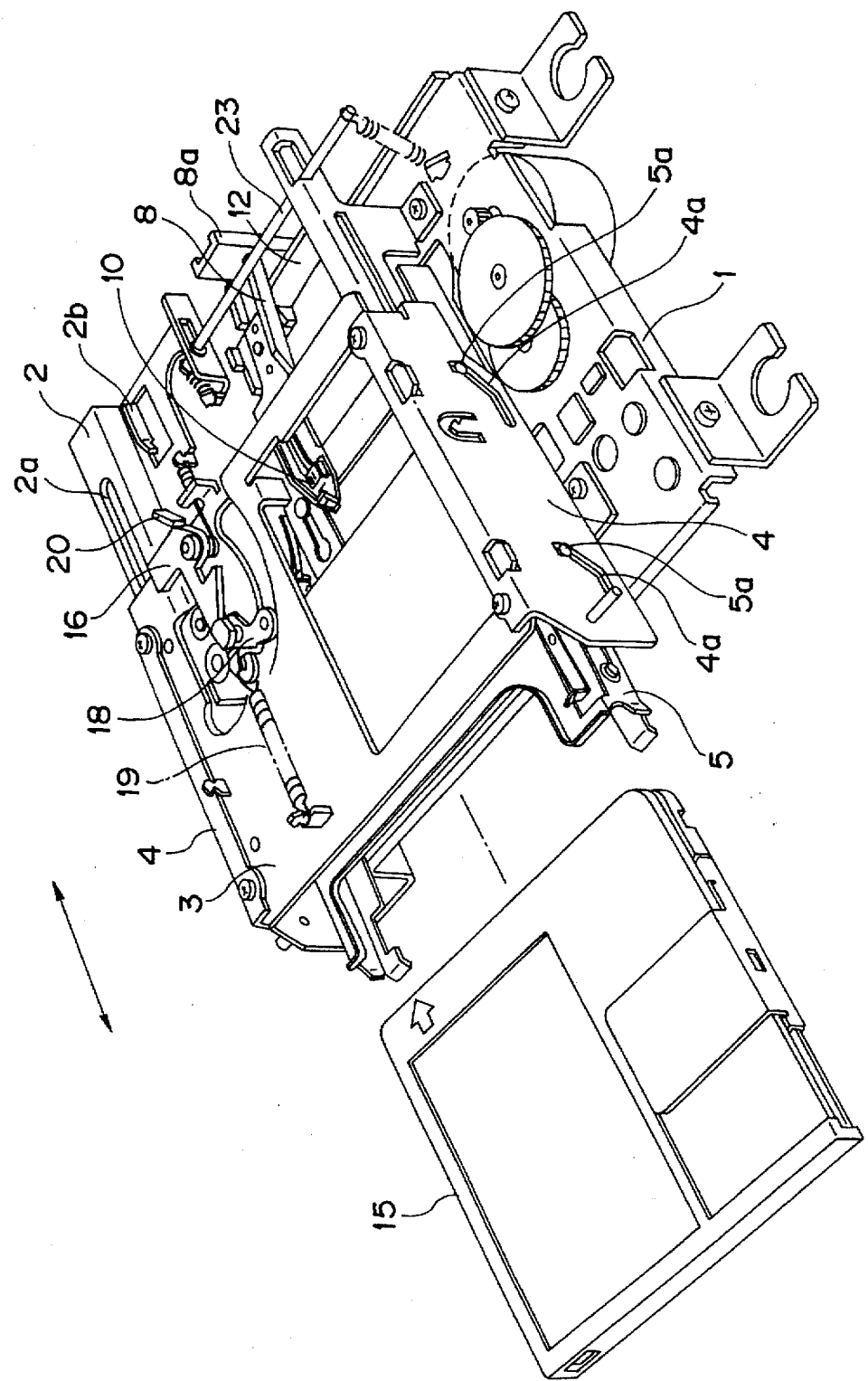
FIG. 1 is a perspective view of a recording and reproducing apparatus as a first embodiment of the present invention.
Figure 2:
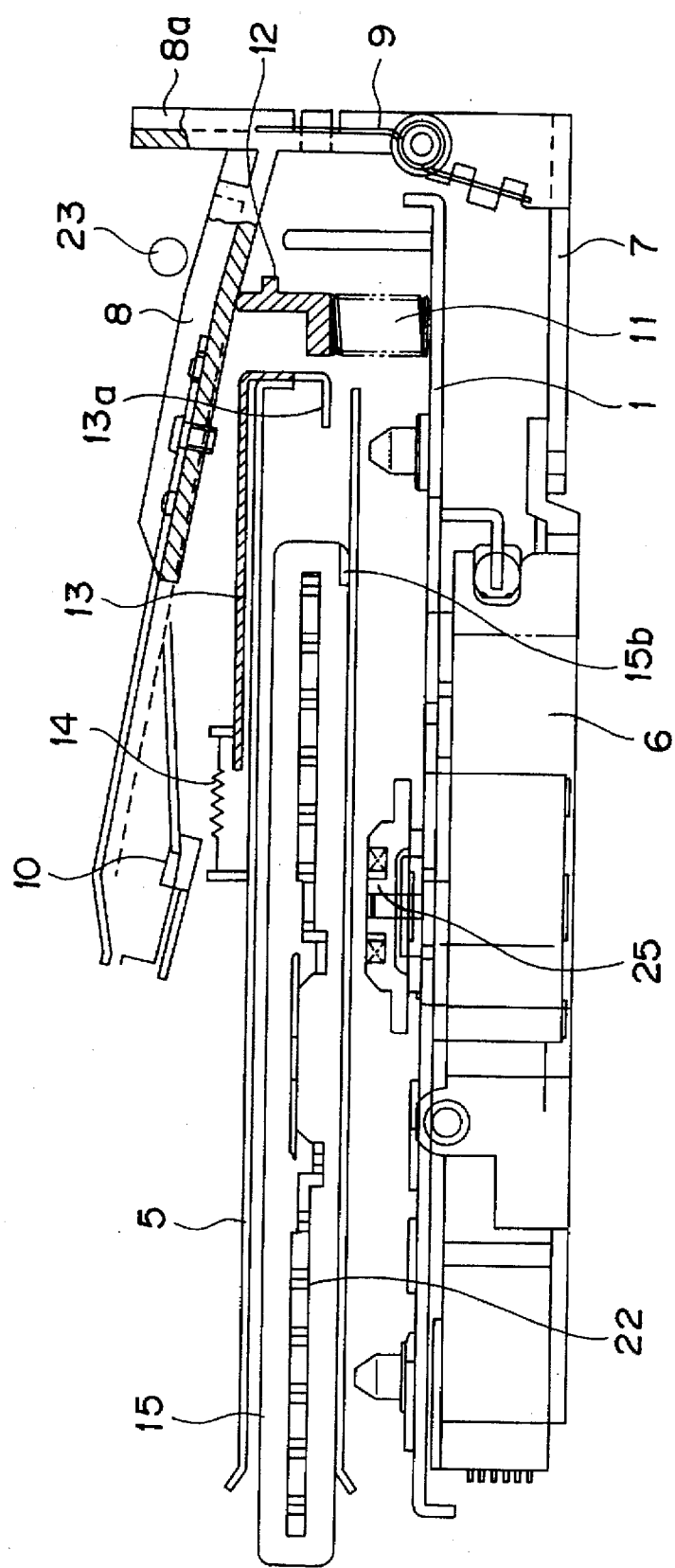
FIG. 2 is a side cross-sectional view of the recording and reproducing apparatus of FIG. 1.

FIG. 1 is a perspective view of a recording and reproducing apparatus as a first embodiment of the present invention, and FIG. 2 is a summarized side cross sectional view in which some mechanisms are omitted.

In FIGS. 1 and 2, the recording and reproducing apparatus for recording and reproducing a magneto optical disc is provided with a base member 1. A loading base 2 is fixed on the base member 1. An upper plate 3 is disposed on an upper surface of the loading base 2 such that a pin (not shown in the figure) of the upper plate 3 is engaged with an elongated opening 2a formed in the loading base 2. Side plates 4 and 4 are attached on the upper plate 3 on both sides thereof. Guide grooves 4a and 4a are formed in the side plates 4 and 4 respectively. Pins 5a and 5a of a cartridge holder 5 are engaged with the guide grooves 4a and 4a respectively, so that the cartridge holder 5 is supported movably between the side plates 4 and 4 along the guide grooves 4a and 4a. On the base member 1, an optical pickup 6 (FIG. 2) is disposed movably in a radial direction of a magneto optical disc 22 (FIG. 2), which is accommodated in a cartridge 15.

In FIG. 2, a supporting member is attached to the optical pickup 6, and a head holder 8 is rotatably disposed on the supporting member 7. Between the head holder 8 and the supporting member 7, a spring 9 is interposed to always apply a spring force to the head holder 8 in a clockwise direction in FIG. 2. Further, a magnetic head 10 is mounted on the head holder 8. Furthermore, a switching lever 12 is mounted on the base member 1 movably in the up and down direction such that the spring force is applied by a coil spring 11 to the switching lever 12 in the upward direction in FIG. 2. At this time, the spring force of the coil spring 11 is set to be larger than that of the spring 9. On an upper surface of the cartridge holder 5, a slide plate 13 is disposed movably in a right and left direction in FIG. 2, such that a spring 14 is interposed between the slide plate 13 and the cartridge holder 5 and that the spring force is applied by the spring 14 to the slide plate 13 in the left direction of FIG. 2. A protruded portion 13a is provided at a right end portion of the slide plate 13 in FIG. 2. The protruded portion 13a is protruded into an internal space of the cartridge holder 5 and is opposed to the cartridge 15 to be loaded.

In FIG. 1, a shaft 23 is attached to the loading base 2 movably in the direction indicated by an arrow in FIG. 1. The spring force is always applied by springs 24 and 24 to the shaft 23 in the left direction in FIG. 2. Further, the head holder 8 is provided with an abutting portion 8a to which the shaft 23 abuts. In FIG. 2, the optical disc 22 accommodated in the cartridge 15 is clamped by the base member 1. The recording and reproducing apparatus is also provided with a turn table 25 for rotating the clamped optical disc 22.

Figure 3:
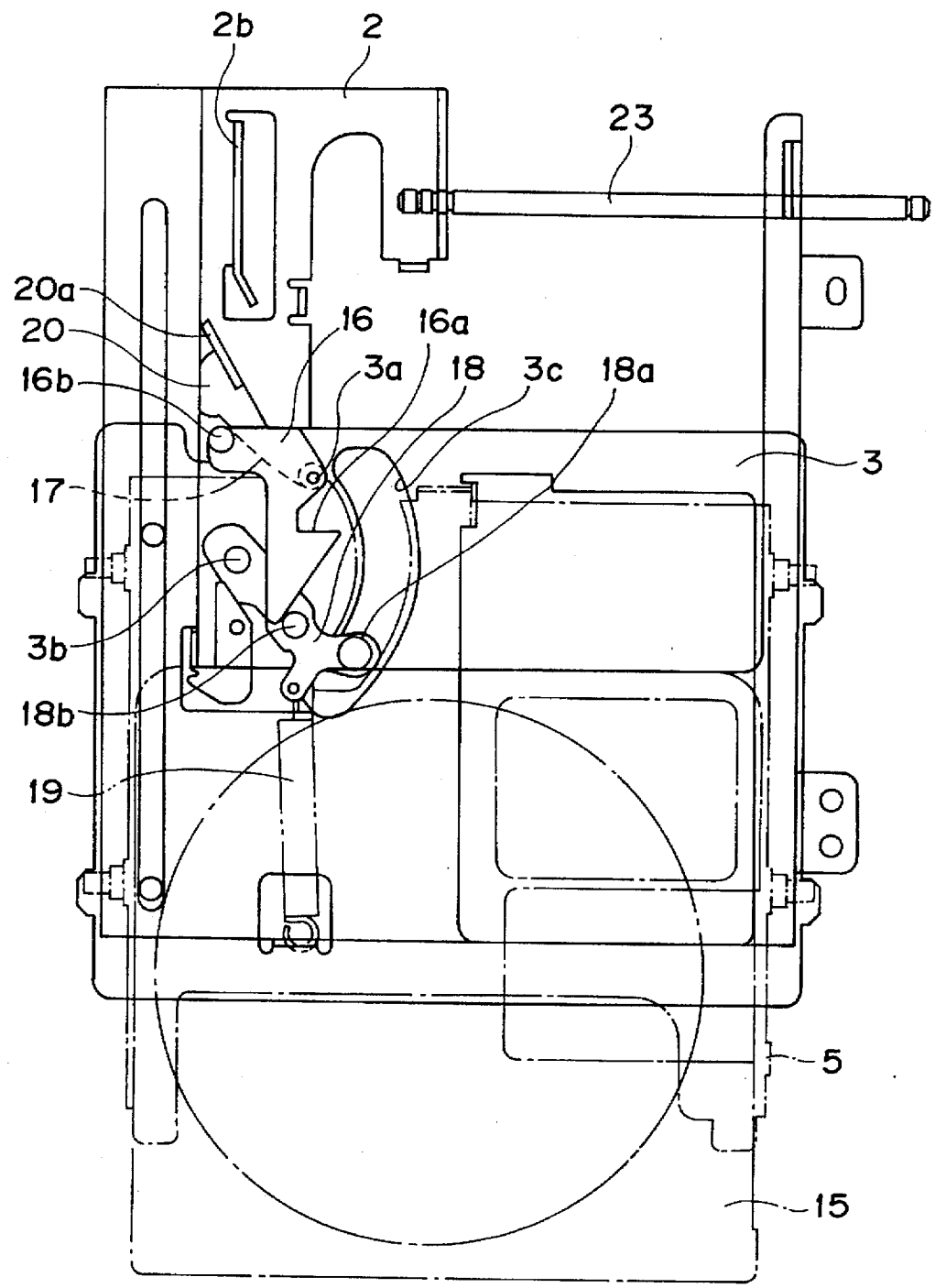
FIG. 3 is a plan view of the recording and reproducing apparatus of FIG. 1.

FIG. 3 is a summarized plan view of the recording and reproducing apparatus of FIG. 1.

In FIG. 3, a lock lever 16 is rotatably engaged with a pin 3a of the upper plate 3. The spring force is always applied by a coil spring 17 to the lock lever 16 in the anti-clockwise direction in FIG. 3. An eject arm 18 is rotatably engaged with a pin 3b of the upper plate 3. The spring force is always applied by a coil spring 19 to the eject arm 18 in the clockwise direction in FIG. 3. The coil spring 19 is set between the elect arm 18 and the upper plate 3. The eject arm 18 is provided with an abutting portion 18a to which one edge of the cartridge 15 abuts, which penetrates through the guide aperture 3c of the upper plate 3, and which is opposed to the cartridge 15. The eject arm 18 is further provided with an engaging pin 18b, which is constructed to engage with an engaging concave portion 16a of the lock lever 16 when the eject arm 18 is rotated. The lock lever 16 is provided with a guide pin 16b. On the other hand, a timing lever 20 is rotatably disposed on the loading base 2. The timing lever 20 is provided with an abutting portion 20a, to which the guide pin 16b of the lock lever 16 abuts. The loading base 2 is provided with a guide member 2b. The guide member 2b is constructed such that the guide pin 16b of the lock lever 16 abuts to the guide member 2b.

Nextly, the action of the recording and reproducing apparatus as described above will be explained.

Figure 4A:
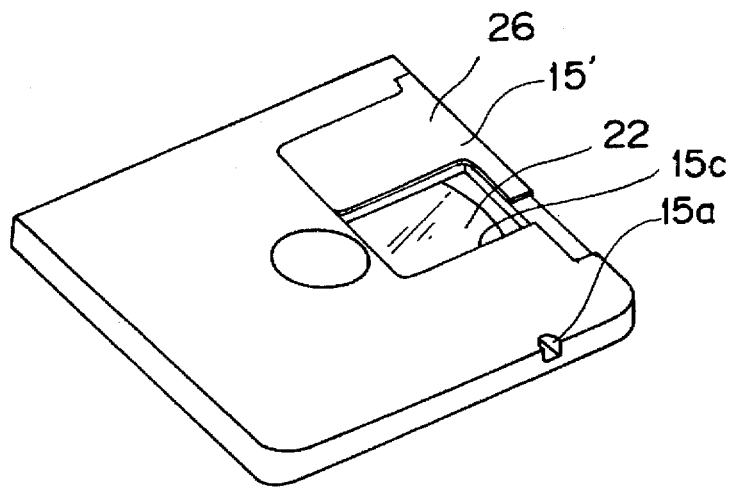
FIG. 4 which consist of FIG. 4A and FIG. 4B, are perspective views of a cartridge used for the recording and reproducing apparatus of FIG. 1.
Figure 4B:
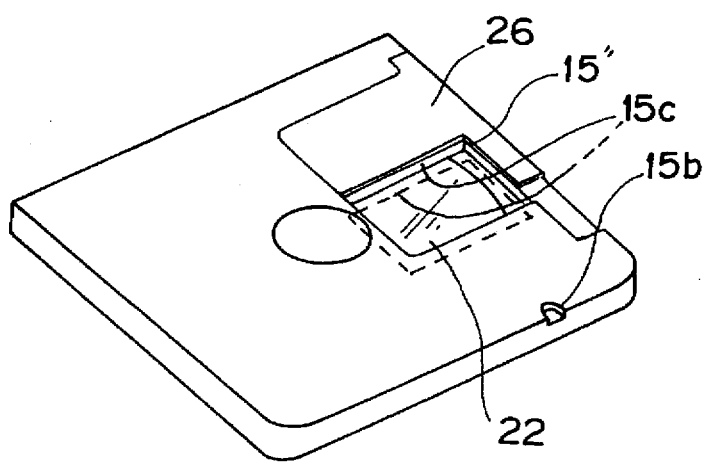

FIG. 4 are perspective views of the cartridges used for the recording and reproducing apparatus of the present embodiment. More concretely, FIG. 4A is a perspective view of a cartridge 15' of read only type. FIG. 4B is a perspective view of a cartridge 15" of write and read type. The cartridge 15' is provided with a judgement recess 15a for indicating that the cartridge is the read only type. The cartridge 15" is provided with a judgement recess 15b for indicating that the cartridge is the write and read type. The depth of the judgement recess 15a is deeper than that of the judgement recess 15b. There is also provided with an exposure opening 15c, which is selectively covered with a cartridge shutter 26, for the optical disc 22. The cartridge 15' of read only type has the exposure opening 15c on only one side of the optical disc 22. The cartridge 15" of write and read type has the exposure opening 15c on each side of the optical disc 22. Either one of those cartridges 15' and 15" is loaded onto the recording and reproducing apparatus of the FIG. 1, as the cartridge 15.

Firstly, the action of the recording and reproducing apparatus is explained as for the case of loading the cartridge 15" of write and read type of FIG. 4B, as the cartridge 15.

Figure 5:
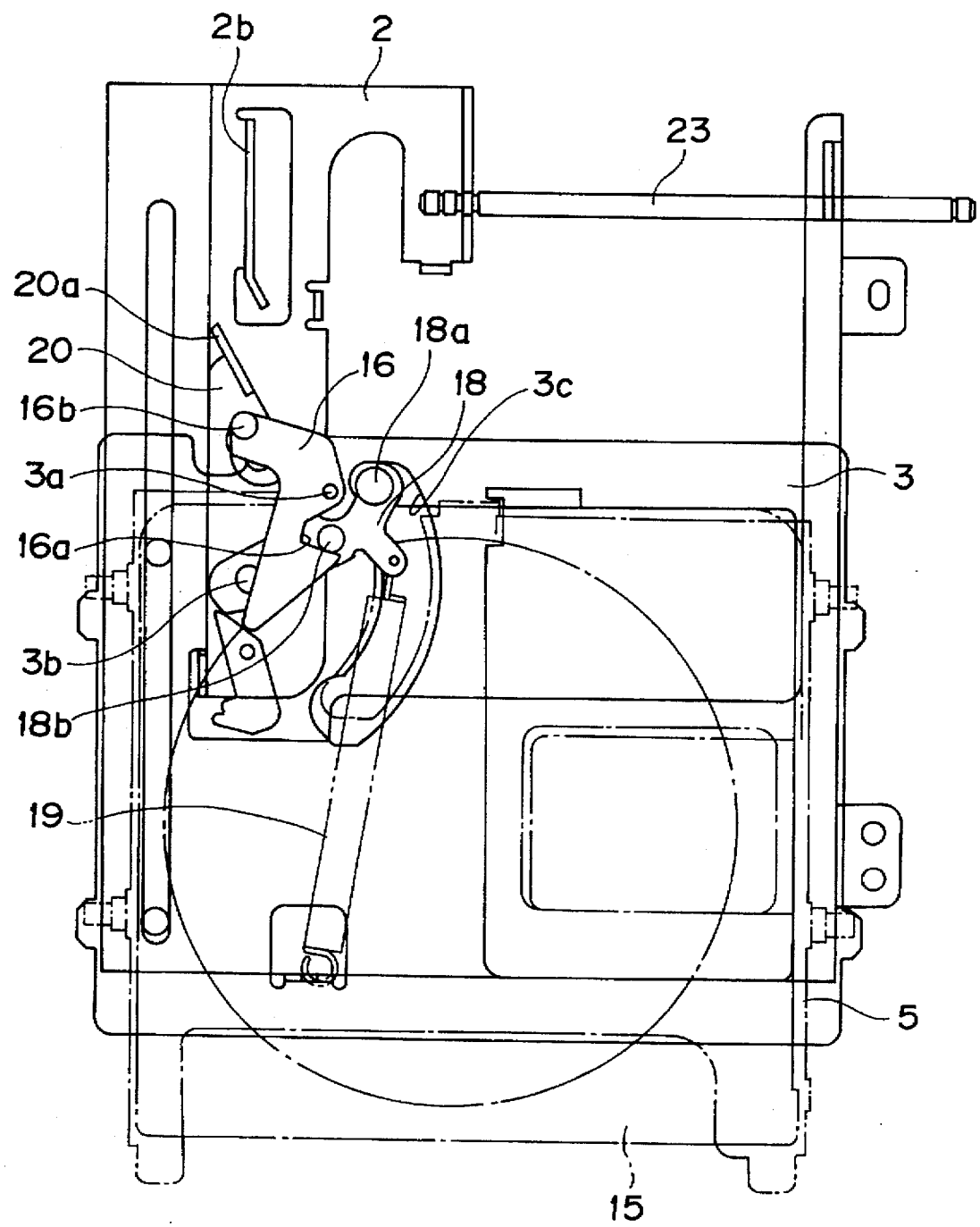
FIG. 5 is a plan view of the recording and reproducing apparatus of FIG. 1.
Figure 6:
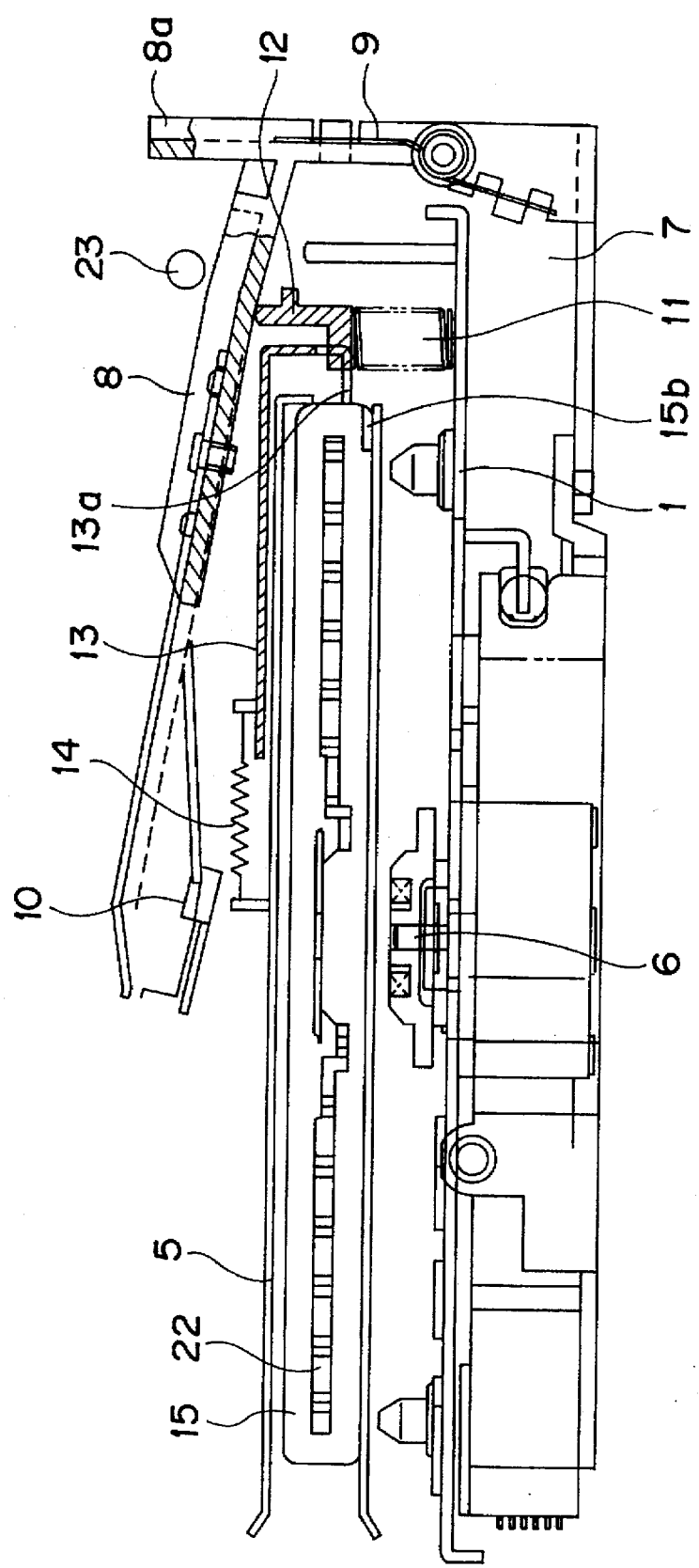
FIG. 6 is a side cross sectional view of the recording and reproducing apparatus of FIG. 1.
Figure 7:
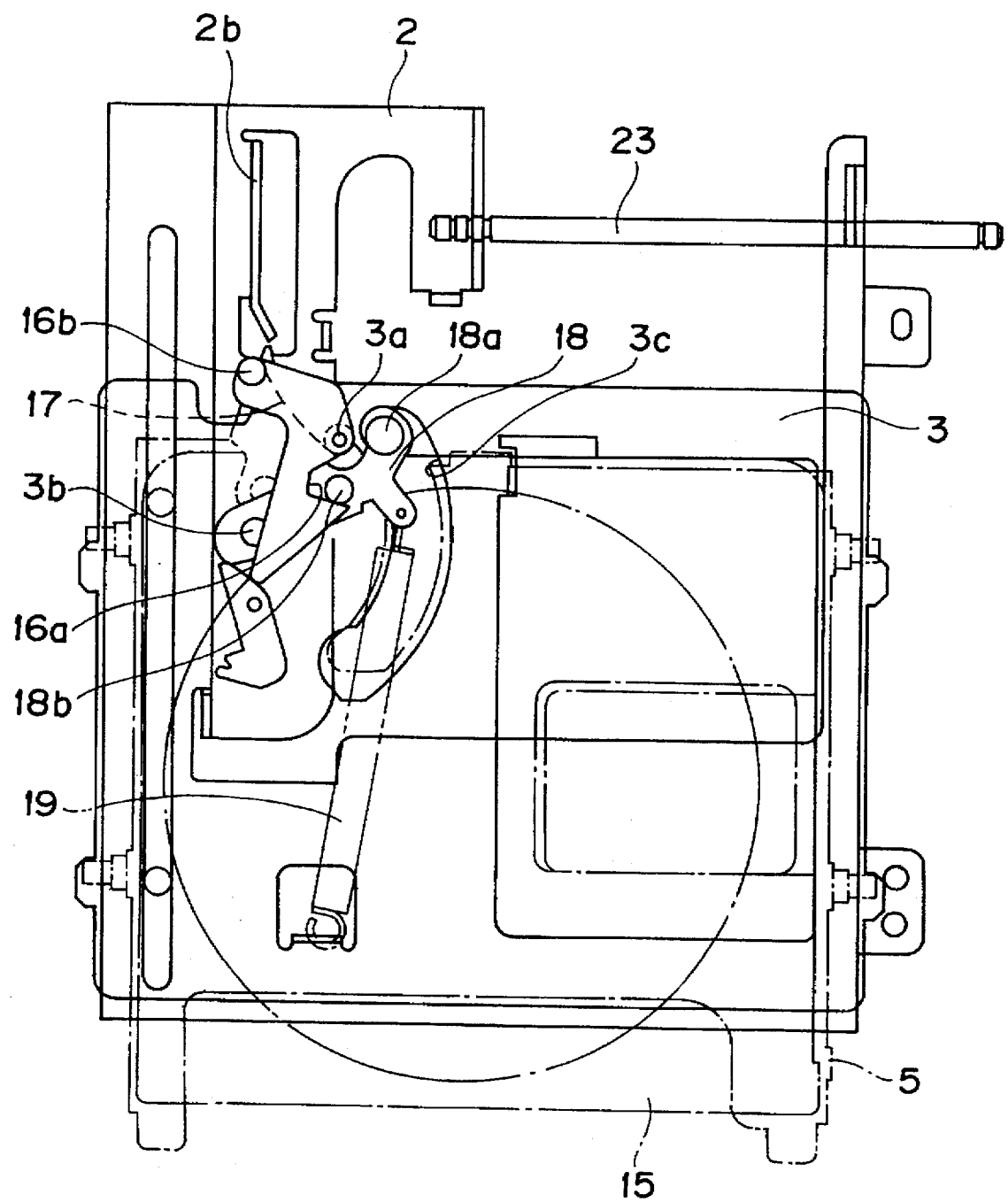
FIG. 7 is a plan view of the recording and reproducing apparatus of FIG. 1.
Figure 8:
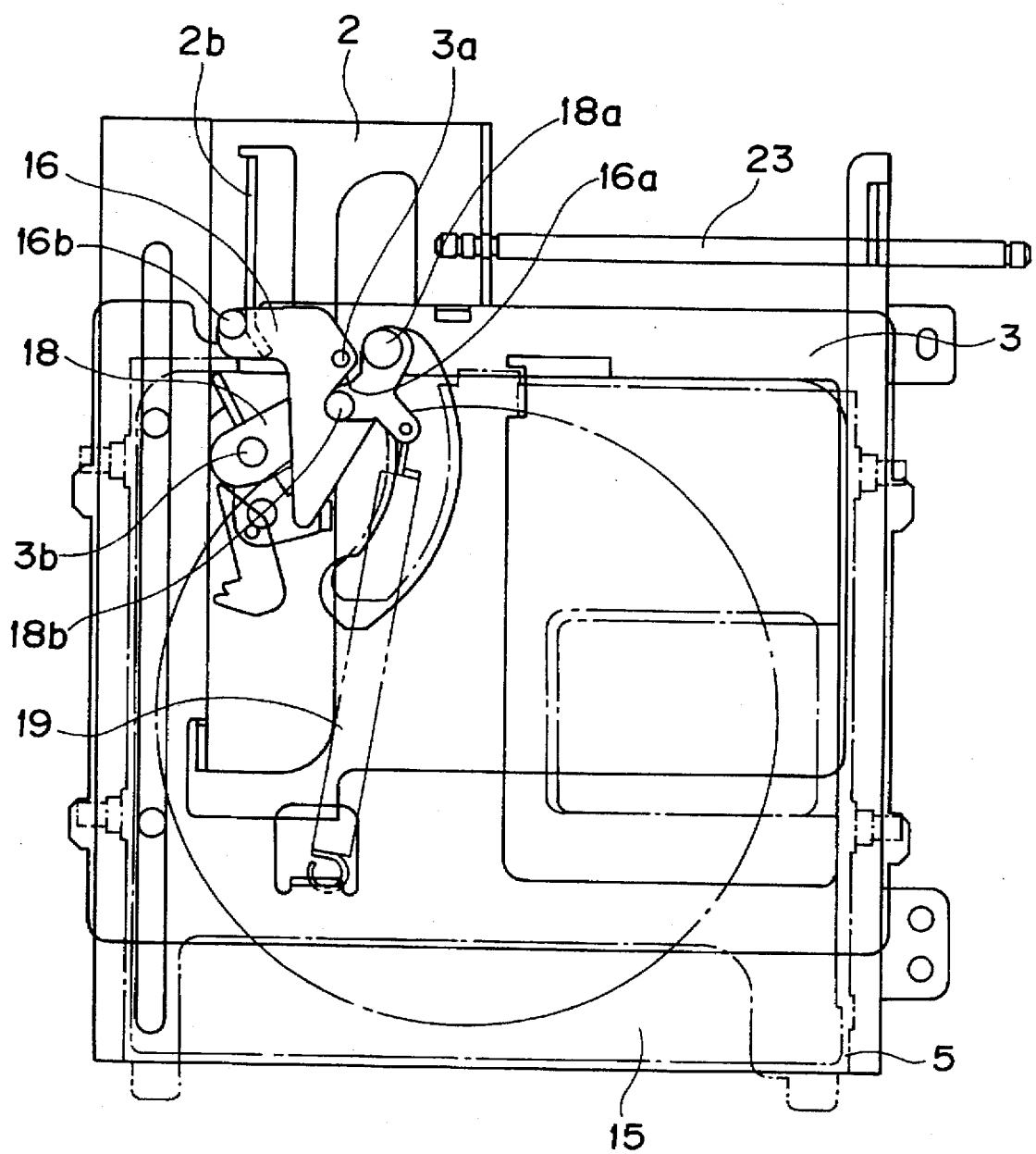
FIG. 8 is a plan view of the recording and reproducing apparatus of FIG. 1.
Figure 9:
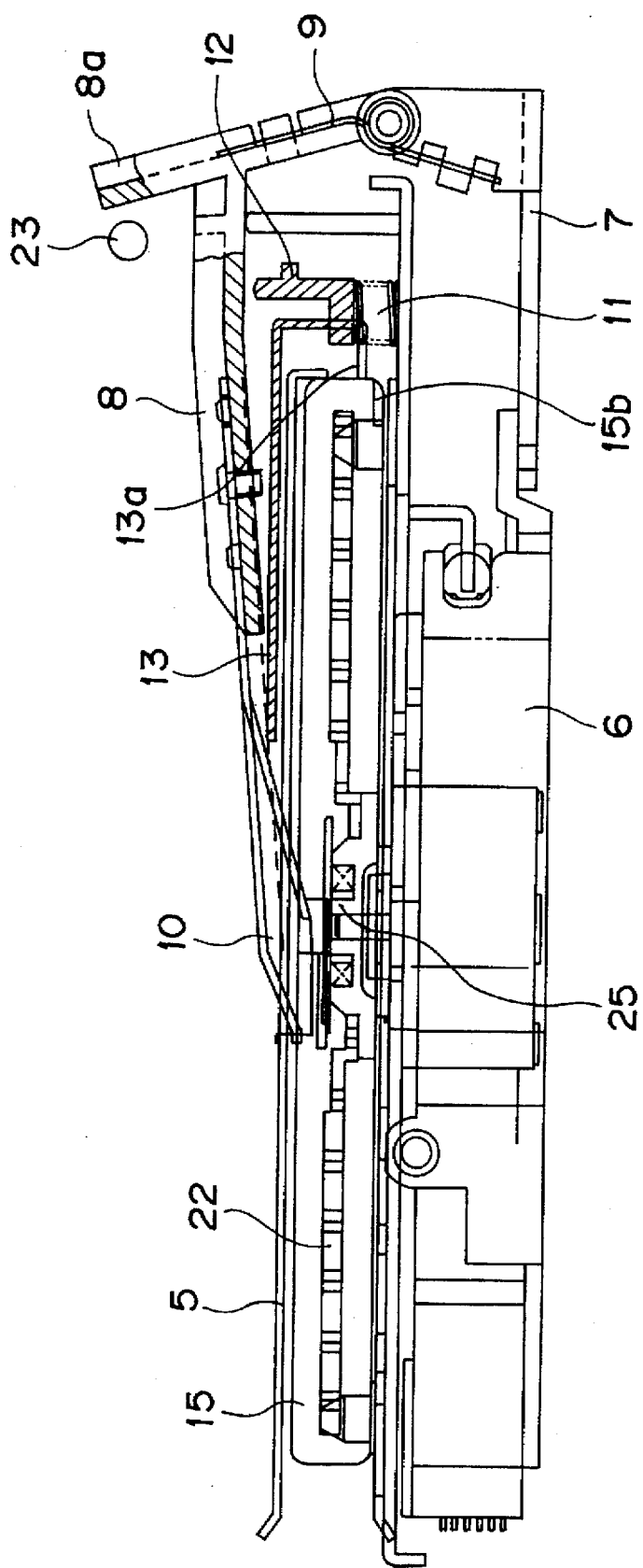
FIG. 9 is a side cross sectional view of the recording and reproducing apparatus of FIG. 1.
Figure 10:
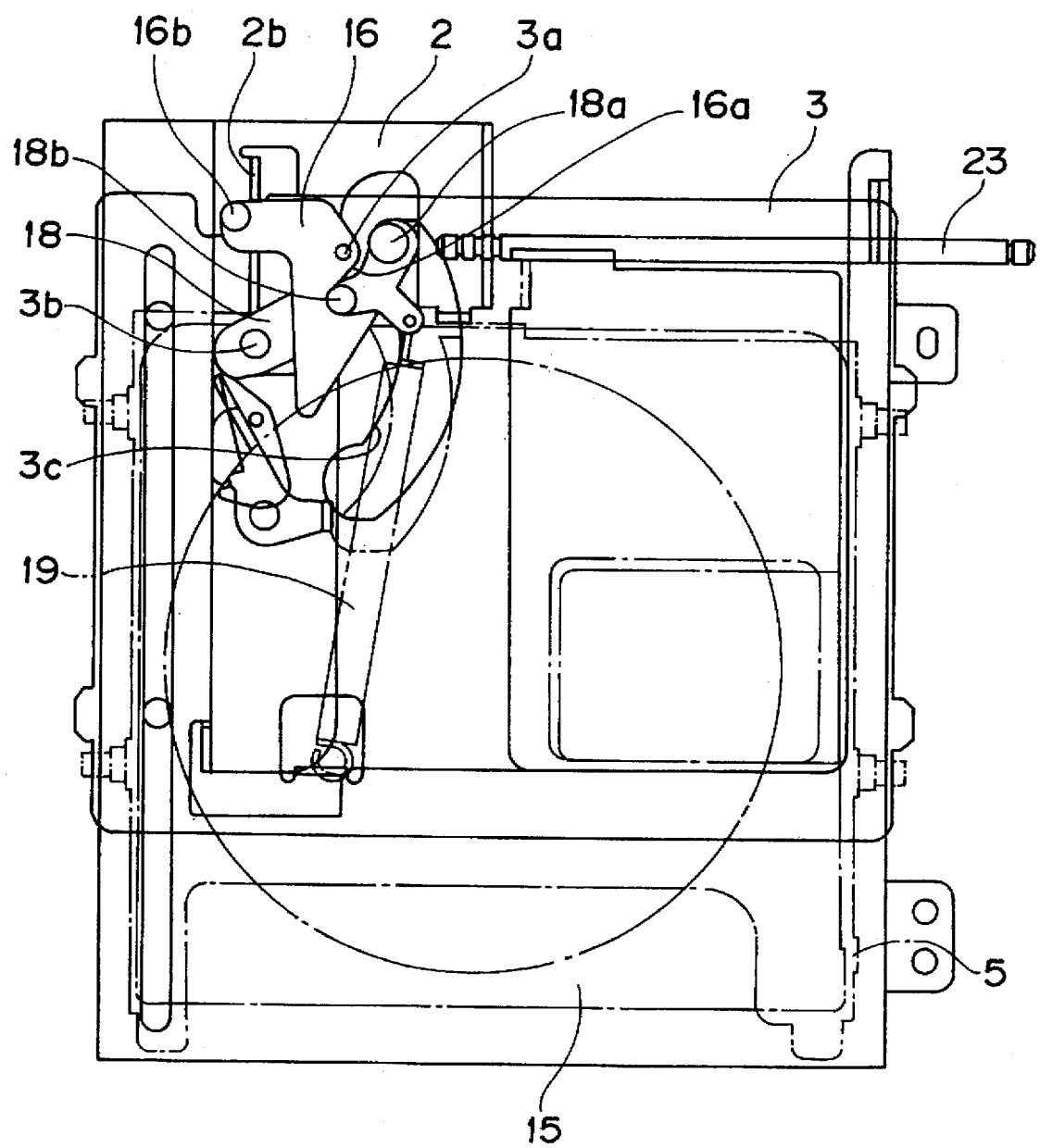
FIG. 10 is a plan view of the recording and reproducing apparatus of FIG. 1.

In FIG. 3, the cartridge 15 is inserted to the cartridge holder 5, so that the edge face of the cartridge 15 abuts to the abutting portion 18a of the eject arm 18. Further, when the cartridge 15 is moved upward in FIG. 3, the eject arm 18 is rotated in the anti-clockwise direction around the pin 3b against the spring force of the coil spring 19 (FIG. 5). At this time, the engaging pin 18b of the eject arm 18 is engaged with the engaging concave portion 16a of the lock lever 16. Thus, the elect arm 18 is prevented from being moved in the clockwise direction by the spring force of the coil spring 19 in FIG. 5. Further, in FIG. 2, the edge face of the cartridge 15 abuts to the protruded portion 13a of the slide plate 13, and in accordance with the movement of the cartridge 15, the slide plate 13 is moved upward in FIG. 2 with respect to the cartridge holder 5 (FIG. 6). In this condition, the drive motor (not shown) is operated, and the upper plate 3 and the side plates 4 and 4 for holding the cartridge holder 5 are moved upward in FIG. 5. At this time, the timing lever 20 is rotated and moved by the guide pin 16b of the lock lever 16 (FIG. 7). Further, when the upper plate 3 etc. is moved to the loading direction of the cartridge 15 (i.e. the upward direction in the figure), the guide pin 16b of the lock lever 16 abuts to the guide member 2b of the loading base 2, so that it is rotated in the anti-clockwise direction around the pin 3a (FIG. 8). By this, the eject arm 18 is rotated in the anti-clockwise direction in the figure around the pin 3b, and the abutting portion 18a is removed from the edge face of the cartridge 15 to cause a space therebetween. Thus, since the external force is not applied to the cartridge 15 via the abutting portion 18a, the clamping operation can be certainly performed. Further, when the upper plate 3 etc. is moved upward in FIG. 8, the cartridge holder 5 is moved downward in FIG. 6 along the guide groove 4a of the side plate 4 (FIG. 1). Along with this action, the slide plate 13 abuts to the switching lever 12, and the switching lever 12 moves downward in FIG. 6, against the spring force of the coil spring 11 (FIG. 9, FIG. 10). Further, the optical disc 22 is clamped by the turn table 25 by this action. Thus, by the switching lever 12, the head holder 8, which rotation has been restricted, is rotated by the spring force of the spring 9 in the anti-clockwise direction in the figure, and the magnetic head 10 is held at a near position, which is at the vicinity of the optical disc 22 in the cartridge 15 to apply enough magnetic field for recording. In this condition, it becomes possible to record the optical disc 22. Namely, under the condition that the magnetic field is applied onto one portion of the optical disc 22 by the magnetic head 10 from one surface side of the optical disc 22, and that the light beam is irradiated onto the same one portion of the optical disc 22 by the optical pickup 6 from the other surface side of the optical disc 22, the optical pickup 6 and the magnetic head 10 are simultaneously moved together in the radial direction of the optical disc 22. By this, the information is recorded onto the optical disc 22.

Figure 11:
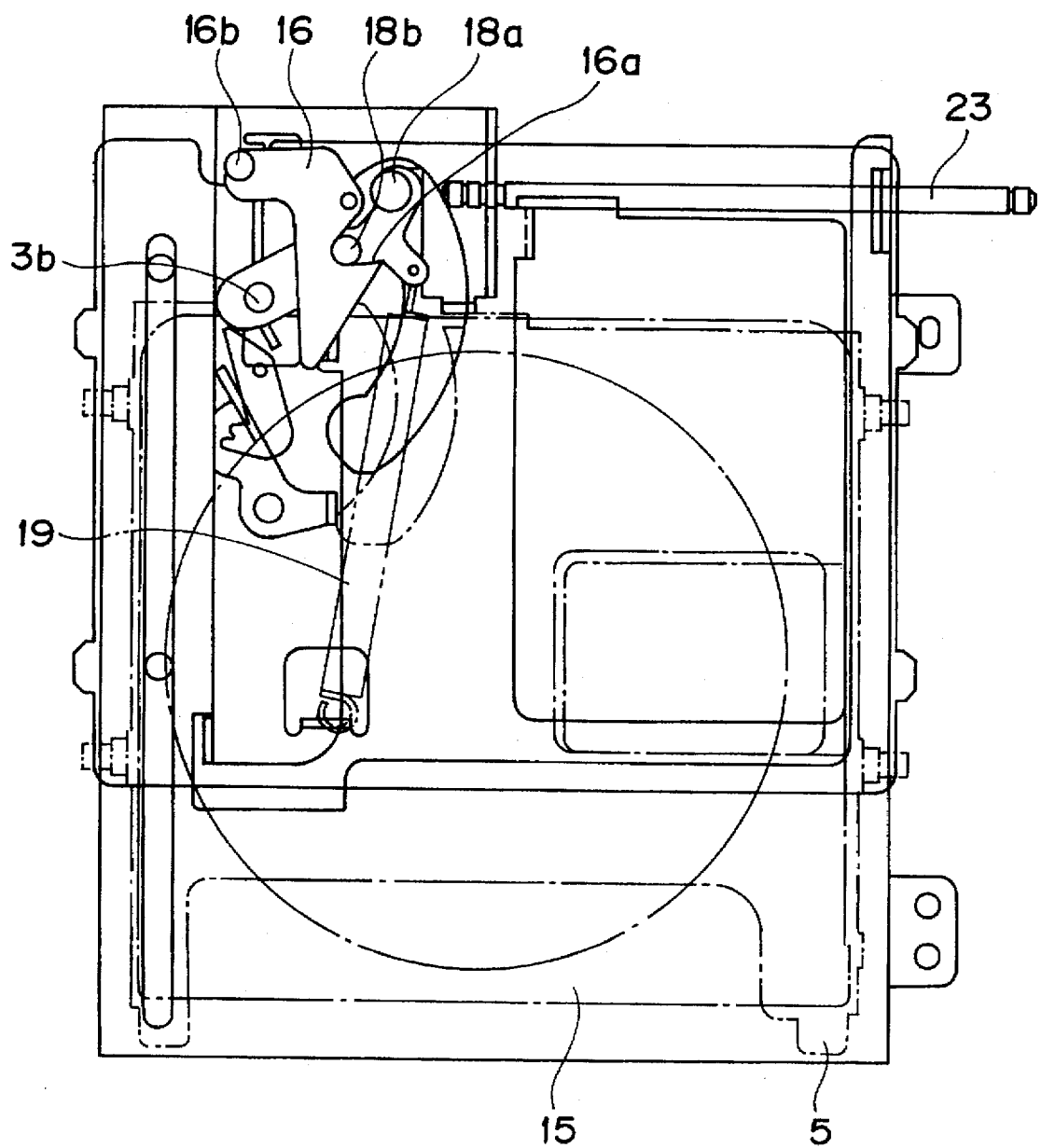
FIG. 11 is a plan view of the recording and reproducing apparatus of FIG. 1.
Figure 12:
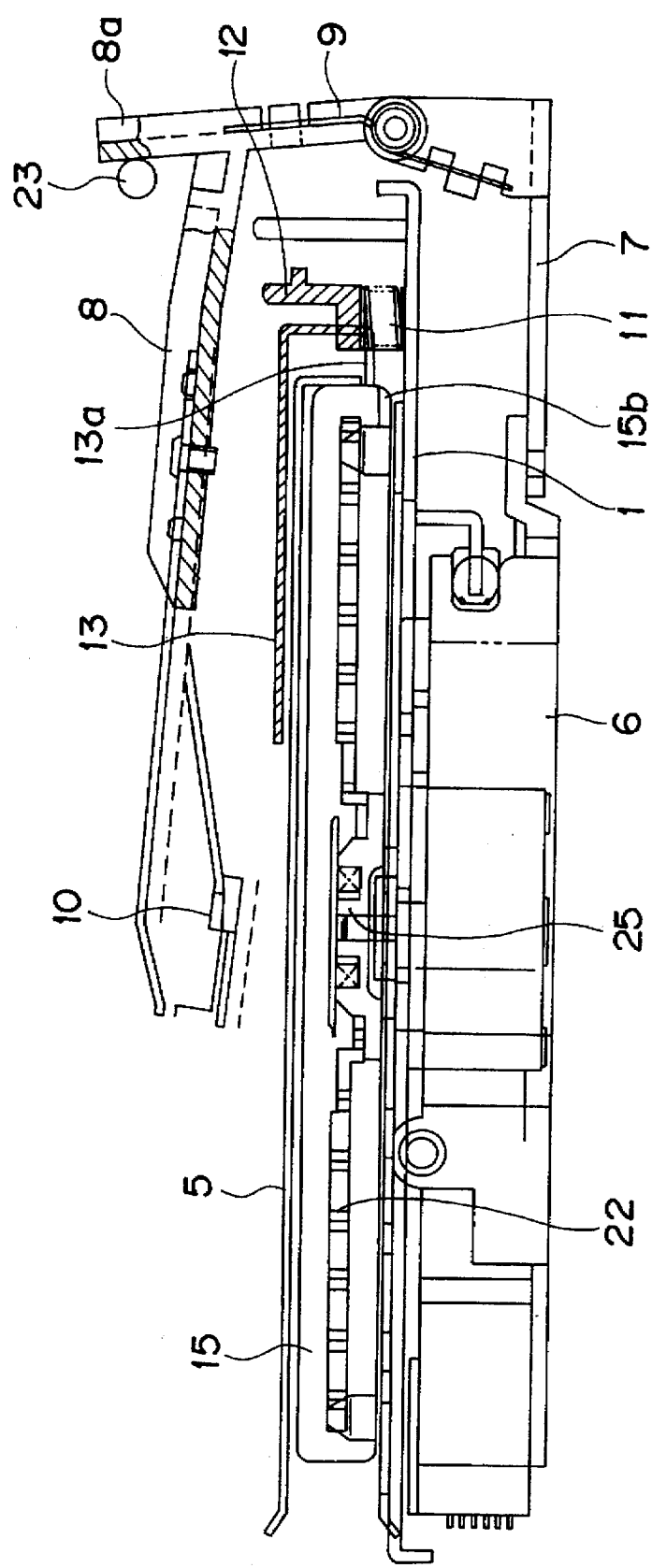
FIG. 12 is a side cross sectional view of the recording and reproducing apparatus of FIG. 1.

Further, in case of reproducing the information recorded on the optical disc 22, it is required to hold the magnetic head 10 at a far position, which is distant from the surface of the optical disc 22 since the magnetic field should not be practically applied to the optical disc 22 in this case. For this requirement, the upper plate 3 etc. is moved in the loading direction (i.e. the upward direction in FIG. 10) of the cartridge 15 in FIG. 10. Then, the shaft 23 is moved upward by the upper plate 3 and the side plate 4 (FIG. 11). This movement of the shaft 23 is in the right direction in FIG. 9, so that it abuts to the abutting portion 8a of the head holder 8 and rotates the head holder 8 in the clockwise direction in FIG. 9 against the spring force of the spring 9 (FIG. 12). By this, it becomes possible to hold the magnetic head 10 at the far position, which is distant from the optical disc 22, and to reproduce the information of the optical disc 22 in this condition.

Nextly, the action at the time of ejecting the cartridge 15 is explained.

Figure 13:
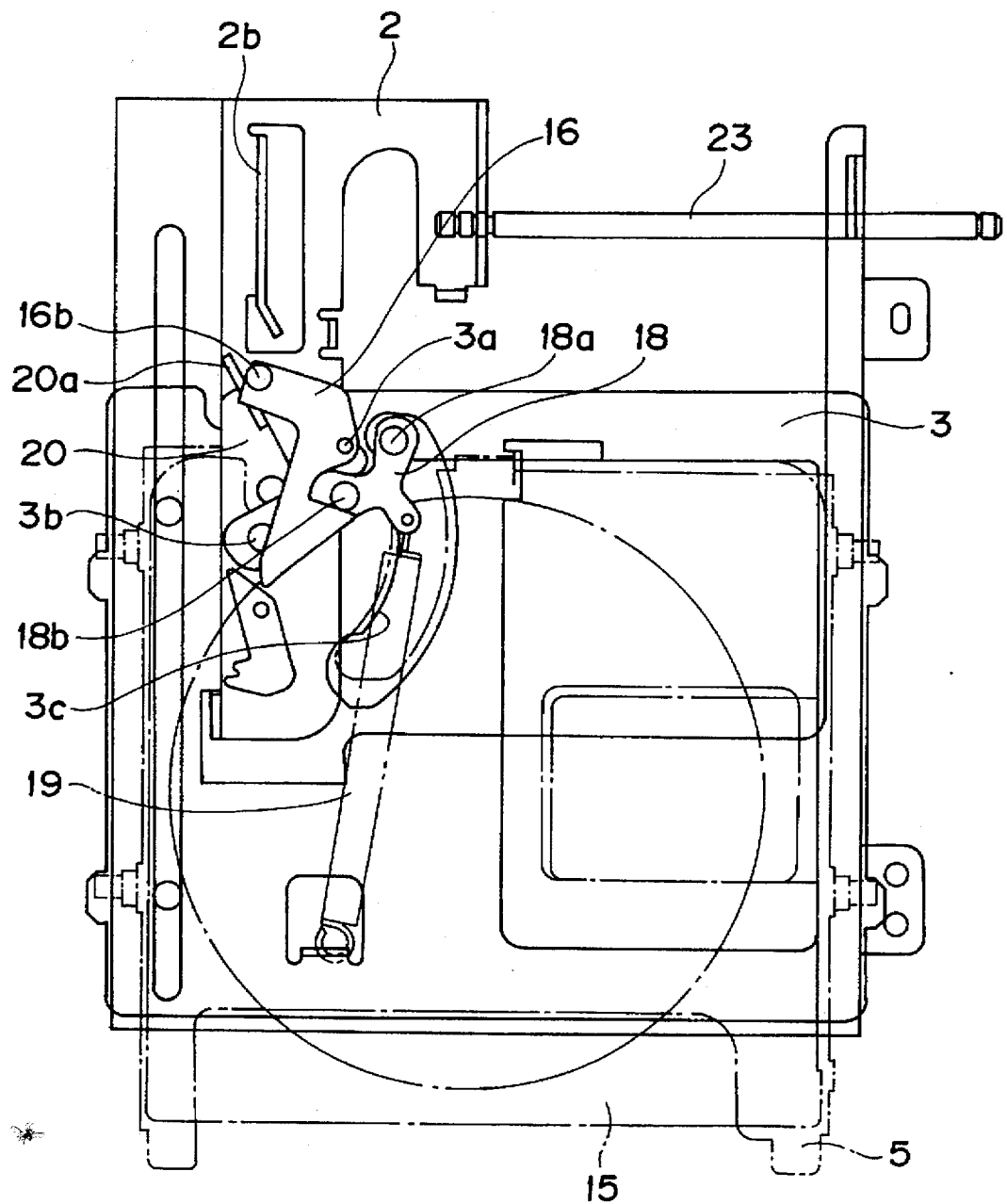
FIG. 13 is a plan view of the recording and reproducing apparatus of FIG. 1.
Figure 14:
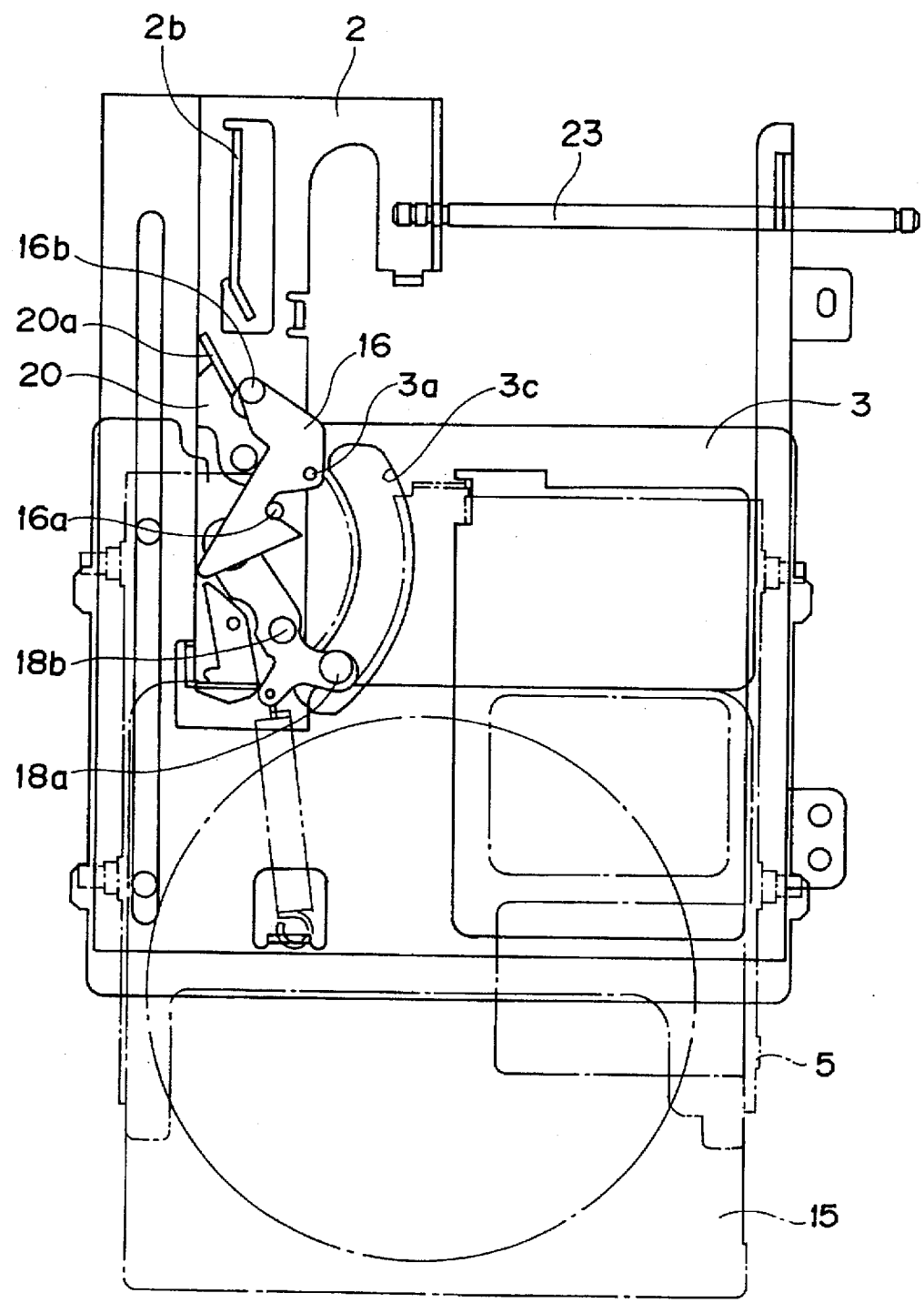
FIG. 14 is a plan view of the recording and reproducing apparats of FIG. 1.

In the condition of FIG. 11, by issuing the starting command for the eject operation, the drive motor (not shown) starts to operate, and the upper plate 3 etc. is moved in the unloading direction, which is the direction for unloading the cartridge 15 (i.e., the downward direction in FIG. 11). Then, as shown in FIG. 13, the guide pin 16b of the lock lever 16 abuts to the abutting portion 20a of the timing lever 20, so that the lock lever 16 is rotated in the clockwise direction around the pin 3a. By this, the engagement pin 18b of the eject arm 18 is removed from the engagement concave portion 16a, and the eject arm 18 is rotated in the clockwise direction in the figure around the pin 3b by the spring force of the coil spring 19 (FIG. 14). By this, the abutting portion 18a pushes the cartridge 15 out of the cartridge holder 5. Then, when the upper plate 3 etc. is further moved in the unloading direction of the cartridge 15 (i.e. the downward direction in the figure), the guide pin 16b of the lock lever 16 is removed from the abutting portion 20a of the timing lever 20, and the condition of the lock lever 16 returns to the initial condition by the spring force of the coil spring 17 (FIG. 3).

Nextly, the action at the time of loading the cartridge 15' of read only type of FIG. 4A as the cartridge 15 is explained.

Figure 15:
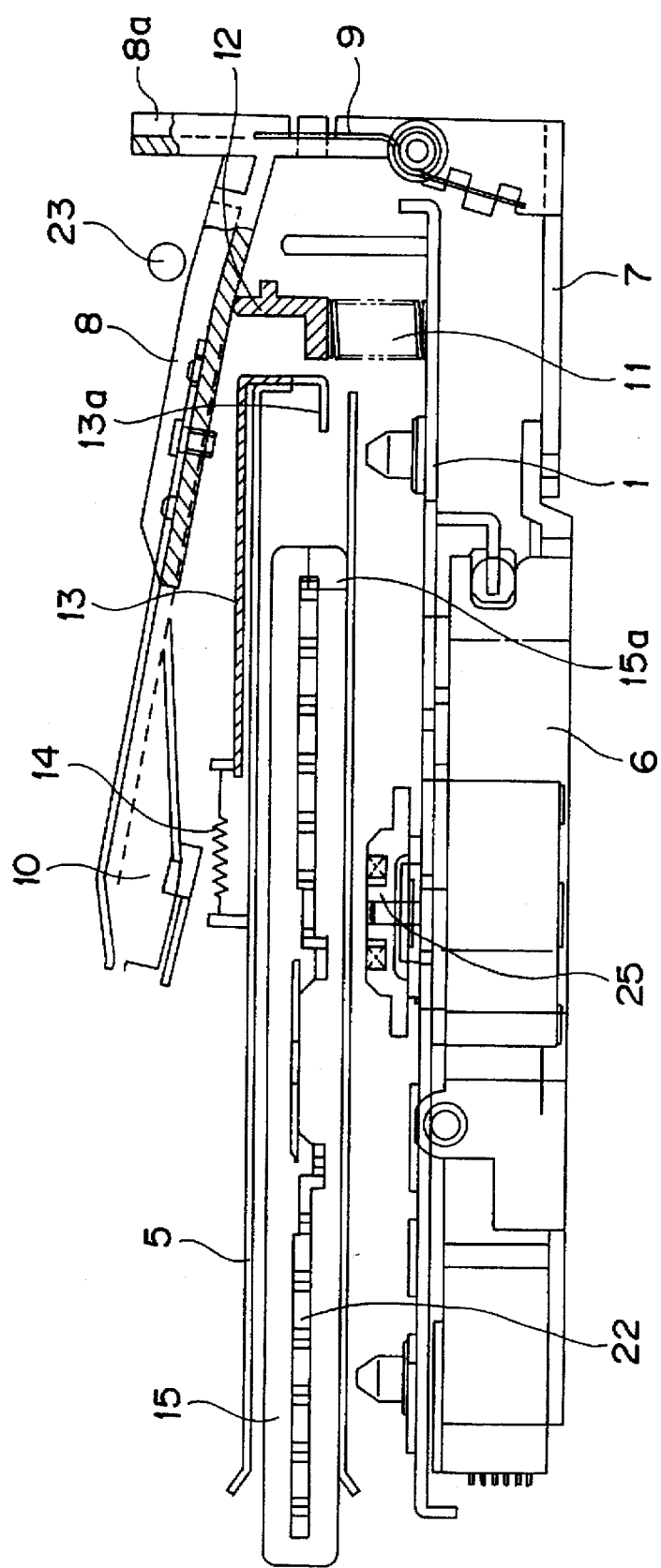
FIG. 15 is a side cross sectional view of the recording and reproducing apparatus of FIG. 1.
Figure 16:
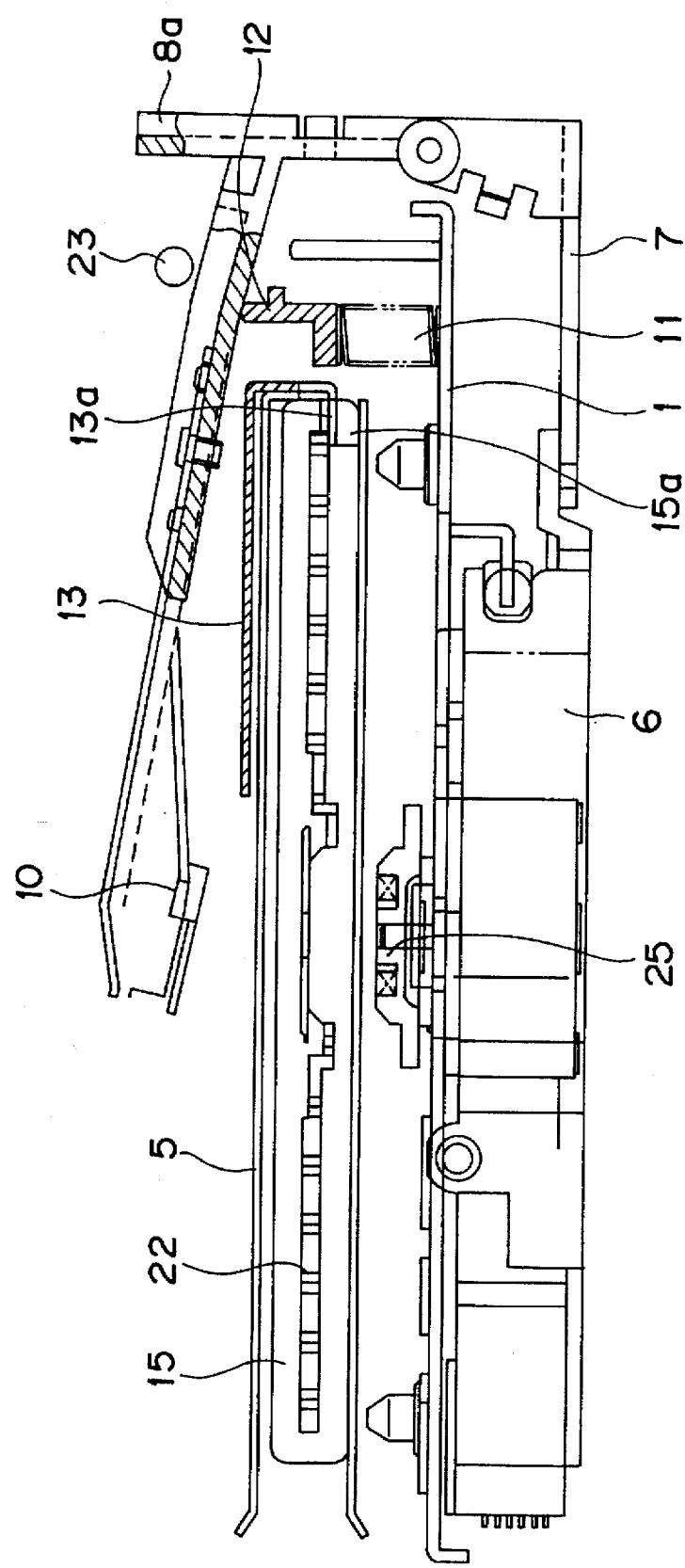
FIG. 16 is a side cross sectional view of the recording and reproducing apparatus of FIG. 1.
Figure 17:
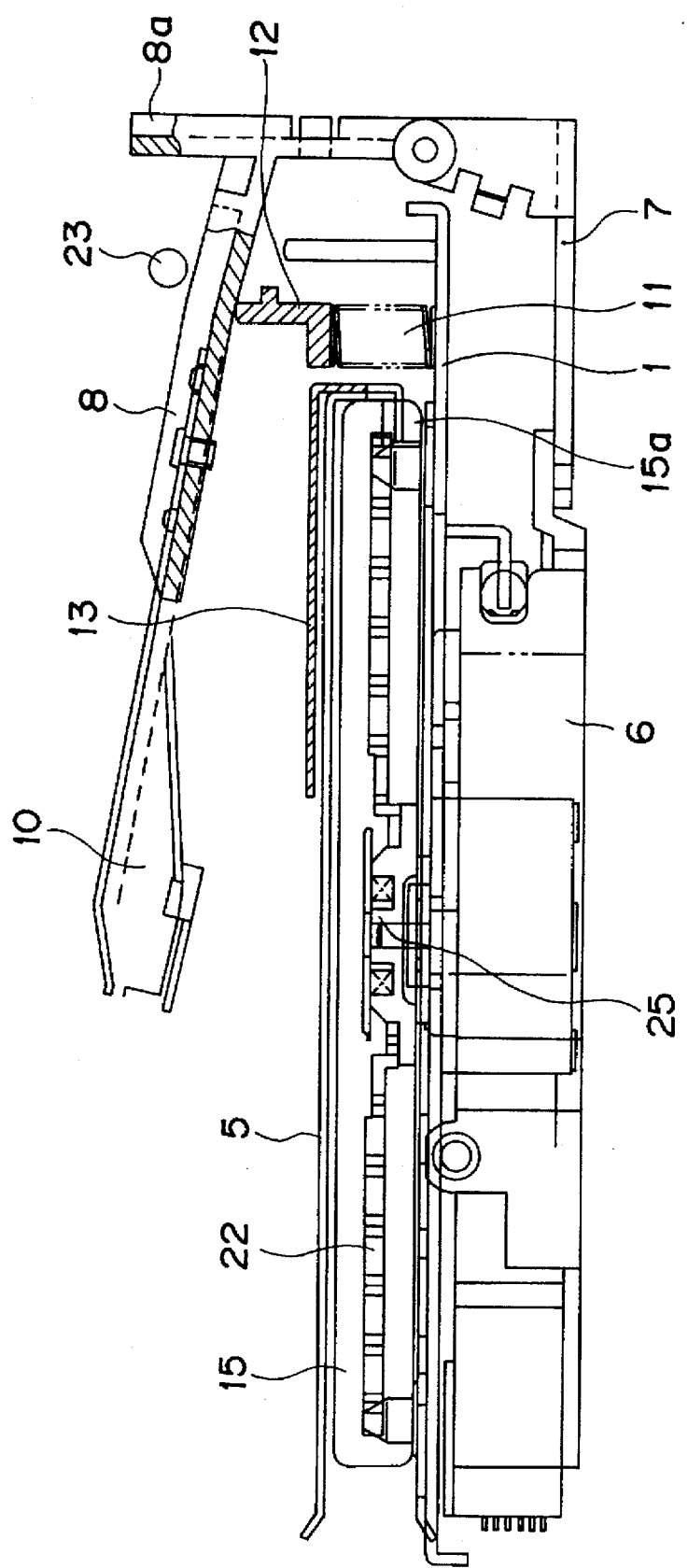
FIG. 17 is a side cross sectional view of the recording and reproducing apparatus of FIG. 1.

In FIG. 15, the cartridge 15 is inserted into the cartridge holder 5. Then, the protruded portion 13a of the slide plate 13 is stored in the judgement recess 15a, which indicates the read only type and which is formed on the cartridge 15, so that the slide plate 13 is not moved with respect to the cartridge holder 5 (FIG. 16). Further, the cartridge holder 5 is moved downward in FIG. 16 along the guide groove 4a (FIG. 1) of the side plate 4 (FIG. 17). However, at this time, since the slide plate 13 is not moved with respect to the cartridge holder 5, the slide plate 13 does not abut to the switching lever 12, so that the switching lever 12 is not moved but is held in the restricted position. Therefore, the head holder 8 holding the magnetic head 10 is held in the condition that it abuts to the switching lever 12, to which the spring force is always applied in the upward direction in the figure, by the coil spring 11. Thus, the head holder 8 is not swung or rotated by the spring force of the spring 9, and the magnetic head 10 is held in the far position. Namely, in case of loading the cartridge 15 of read only type, the movement of the head holder 8 can be certainly restricted or regulated.

Nextly, a second embodiment of the present invention will be explained.

Figure 18:
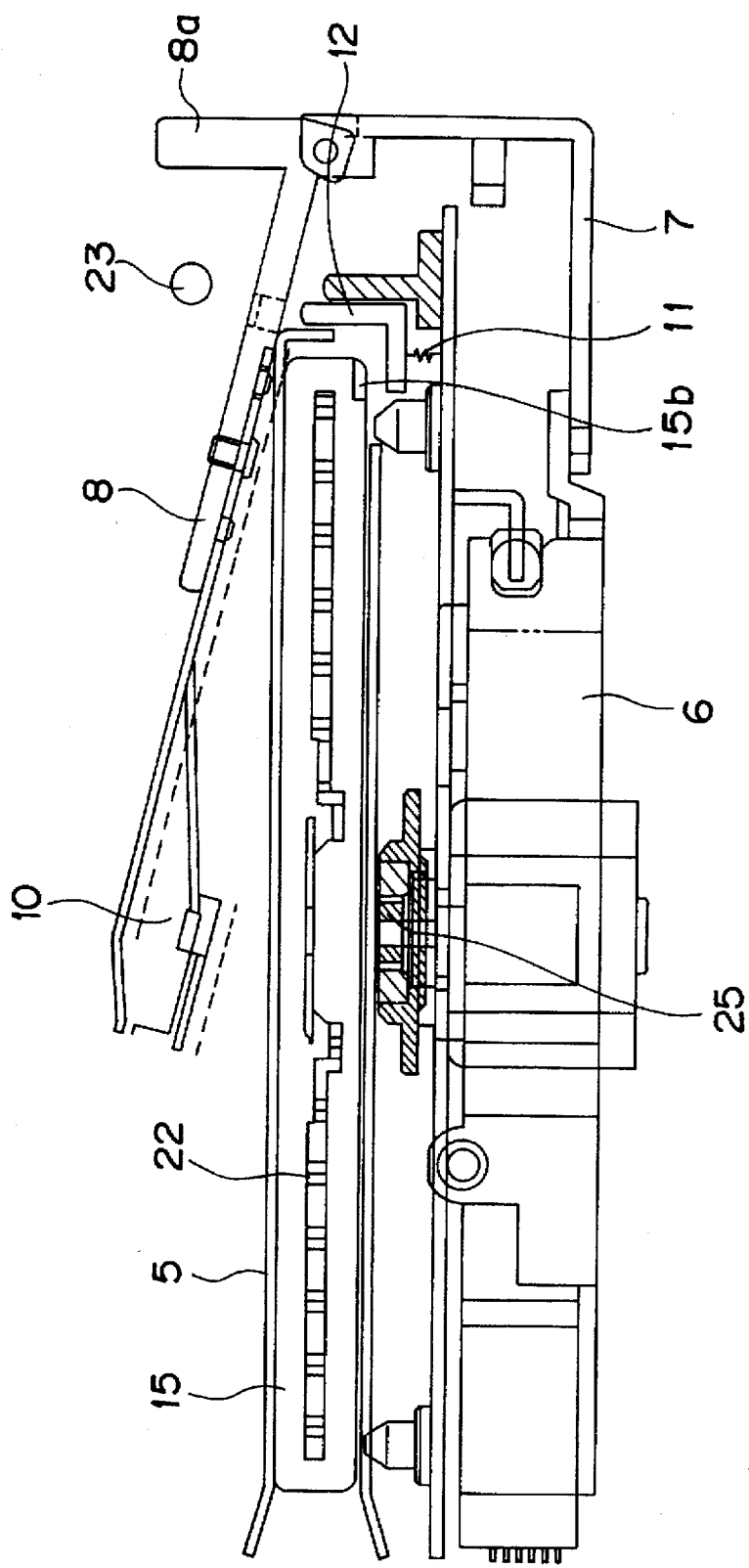
FIG. 18 is a side cross sectional view of a recording and reproducing apparatus as a second embodiment of the present invention.

FIG. 18 is a cross sectional view of a recording and reproducing apparatus as a second embodiment of the present invention. In FIG. 18, the same constitutional elements as those in the aforementioned first embodiment carry the same reference numerals and the explanations thereof are omitted.

Figure 19:
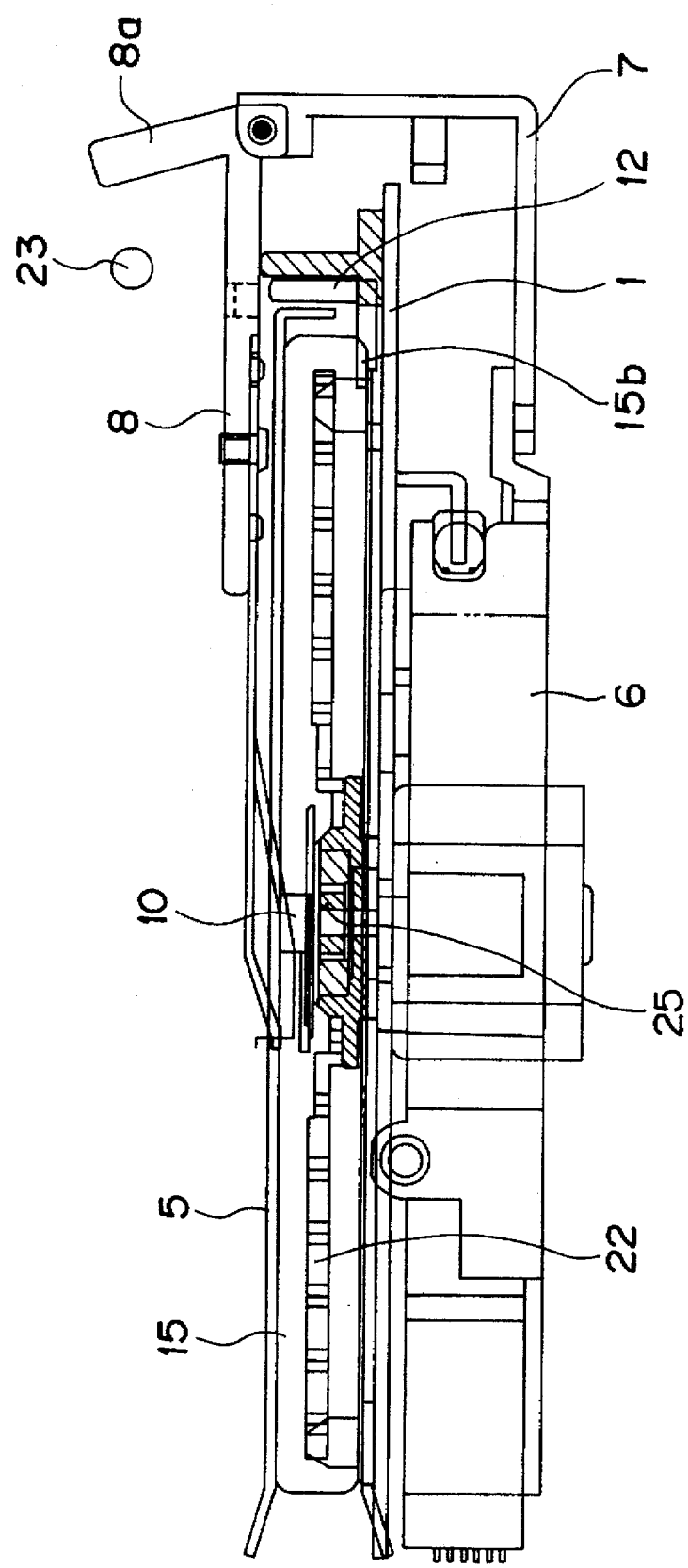
FIG. 19 is a side cross sectional view of the recording and reproducing apparatus of FIG. 18.

Namely, the second embodiment is constructed such that it is not provided with the slide plate 13 (FIG. 2). In FIG. 18, when the cartridge 15 of writing and reading type is inserted into the cartridge holder 5, the cartridge 15 of writing and reading type directly pushes down the switching lever 12 against the spring force of the coil spring 11, to hold it at the predetermined position (FIG. 19). By this, the head holder 8 provided with the magnetic head 10 is also rotated, and the magnetic head 10 is approached to the optical disc 22 in the cartridge 15 to be held at the near position. In this condition, it is possible to record information onto the optical disc 22.

Figure 20:
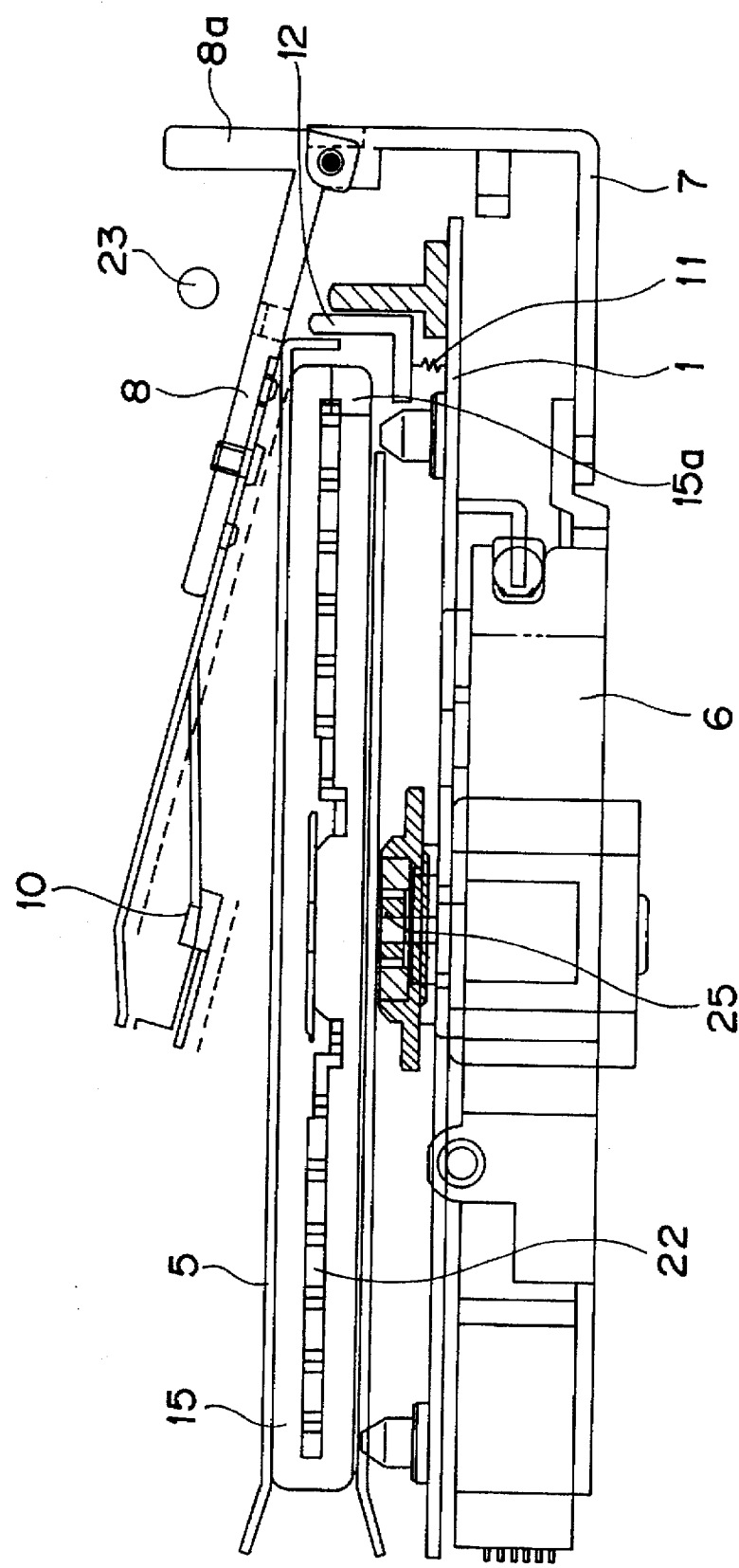
FIG. 20 is a side cross sectional view of the recording and reproducing apparatus of FIG. 18.
Figure 21:
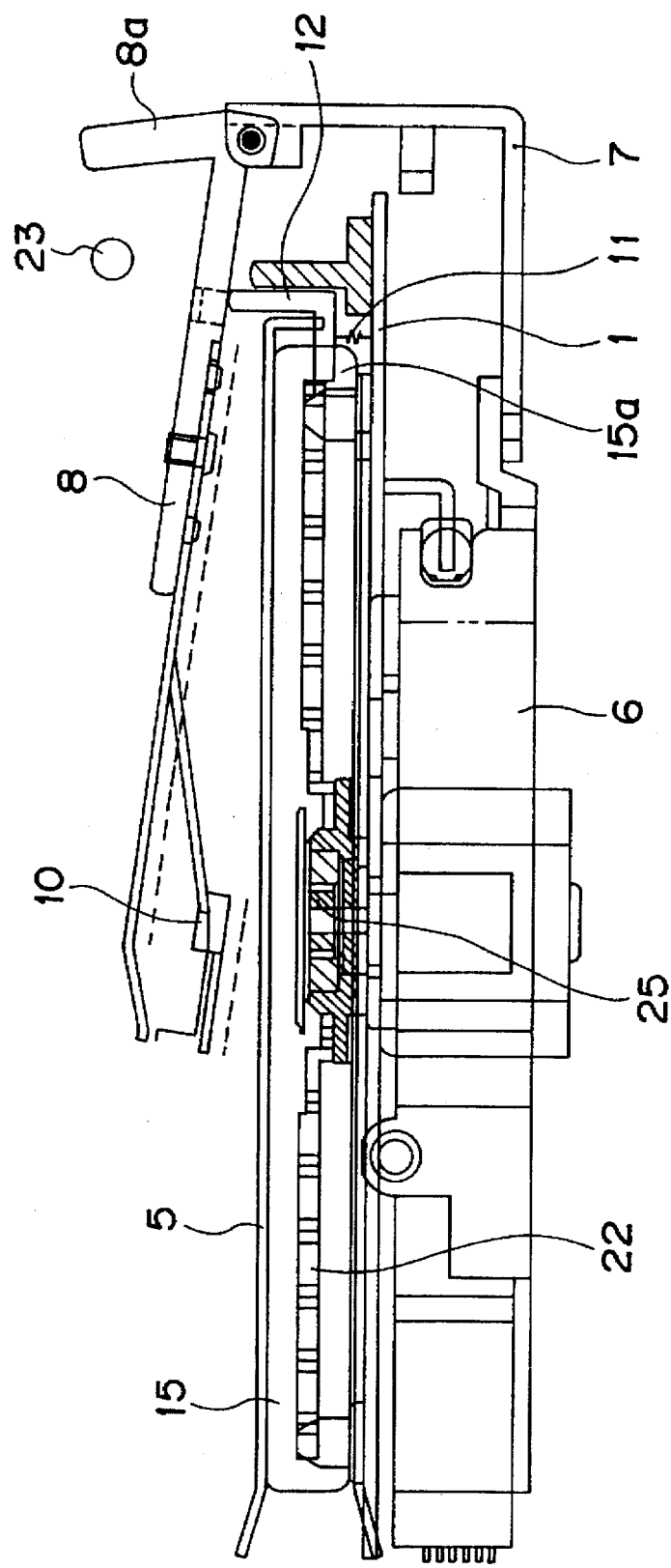
FIG. 21 is a side cross sectional view of the recording and reproducing apparatus of FIG. 18.

In case of loading the cartridge 15 of read only type, even if the cartridge holder 5 accommodating the cartridge 15 is moved downward from the condition of FIG. 20, since the judgement recess 15a is deep, the switching lever 12 is not pressed down in the downward direction in the figure to be held at the restricted position as shown in FIG. 21. Thus, the head holder 8 holding the magnetic head 10 is held in the condition that it abuts to the switching lever 12 to which the spring force is always applied by the coil spring 11 in the upward direction in the figure. Consequently, it becomes possible to restrict or regulate the movement of the head holder 8, so that the magnetic head 10 is held at the far position.

As described above, the first and second embodiments have advantageous effects which are contradict to each other, and it is possible to select one of those embodiments in accordance with the actually given conditions. Namely, if it is desired to make the mechanism simpler, the second embodiment can be preferably employed since the slide plate is not employed in the second embodiment. If it is desired to reduce the burden on the cartridge, the first embodiment can be preferably employed.

This reduction of the burden on the cartridge is briefly explained here. In the second embodiment, if the cartridge 15 of write and reading type is loaded, the judgement recess 15b directly applies the pressure onto the switching lever 12, so that the cartridge 15 receives the reaction force by the coil spring 11. However, since the cartridge 15 is fixed on the turn table at the central portion thereof, the reaction force is generated such that the cartridge 15 is distorted while the central portion acts as the fulcrum, which is the burden on the cartridge. On the contrary, in the first embodiment, since the slide plate 13 presses the switching lever 12 in place of the cartridge, and since the cartridge 15 and the slide plate 13 are constructed such that they abut to each other in the direction perpendicular to the applied spring force of the coil spring 11, the cartridge 15 does not directly receive the spring force of the coil spring 11, and the burden on the cartridge is reduced. In this way, the first embodiment is superior to the second embodiment in view of the burden on the cartridge.

As described above in detail, according to the present embodiments, when the cartridge of write and read type is loaded, the magnetic head is held under the condition that it can be moved between the near position and the far position. When the cartridge of read only type is loaded, the position of the magnetic head can be restricted to the far position with respect to the optical disc. Accordingly, even if the external vibration or shock is applied or an erroneous operation is performed for example, the apparatus is not damaged, and the safety of the apparatus can be improved.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A recording and reproducing apparatus, to which one of a cartridge of write and read type and a cartridge of read only type is selectively loaded, said cartridge of write and read type accommodating a magneto optical disc of write and read type and being provided with a first judgement recess which has a first depth to indicate the write and read type, said cartridge of read only type accommodating a magneto optical disc of read only type and being provided with a second judgement recess which has a second depth deeper than the first depth to indicate the read only type, said apparatus comprising:

a base portion having an upper surface;

an optical pickup unit disposed movably on said base portion and having an optical pickup for recording and reproducing the magneto optical disc of the loaded cartridge;

a magnetic head for applying a magnetic field to the magneto optical disc of the loaded cartridge;

a head movement means for holding said magnetic head and moving said magnetic head between a near position and a far position, said near position being a position near the magneto optical disc of the loaded cartridge enough to apply the magnetic field of the magnetic head for recording thereto, said far position being a position too far from the magneto optical disc of the loaded cartridge to apply the magnetic field of the magnetic head for recording thereto;

a switching lever, which is movably fixed on said base portion such that said switching lever reciprocates in directions perpendicular to said upper surface between a non-regulating position to allow said magnetic head to move between the near position and the far position, and a regulating position to regulate the position of said magnetic head at the far position, for pushing up, at a first portion thereof, the head movement means to move said magnetic head to the far position as said switching lever moves perpendicularly away from the upper surface to the regulating position;

a cartridge holder disposed movably on said base portion, for storing and carrying the loaded cartridge in directions toward and away from the upper surface; and a slide plate disposed movably on said cartridge holder along the upper surface and having a protruded portion which is opposed to the cartridge stored in said cartridge holder, and a hook portion for selectively hooking a second portion of said switching lever, said protruded portion abutting to the loaded cartridge at the vicinity of said first judgement recess to move said slide plate in the direction along the upper surface so that said hook portion is hooked to said second portion, and said slide plate pulling down said switching lever by said hook portion hooked to said second portion toward the upper surface to the non-regulating position along with a motion of said cartridge holder toward the upper surface if the loaded cartridge is the write and read type, said protruded portion being engaged with said second judgement recess not to move said slide plate so that said hook portion is not hooked to said second portion, and said switching lever being positioned at the regulating position if the loaded cartridge is the read only type.

2. An apparatus according to claim 1, further comprising an elastic member through which said switching lever is movable fixed on said base portion for applying an elastic force to said switching lever in a direction away from the upper surface toward the regulating position.

3. An apparatus according to claim 2, wherein said switching lever is moved to be positioned at the non-regulating position by being pulled down by said hook portion toward the upper surface against the elastic force of said elastic member if the loaded cartridge is the write and read type.

4. An apparatus according to claim 1, further comprising a spring member connected between said head movement means and said base portion for applying a spring force to said head movement means in a direction toward the far position.

5. An apparatus according to claim 1, further comprising:
a support means for supporting and guiding said cartridge holder along the upper surface; and a drive means for driving said support means in the directions toward and away from the upper surface.

6. A recording and reproducing apparatus, to which one of a cartridge of write and read type and a cartridge of read only type is selectively loaded, said cartridge of write and read type accommodating a magneto optical disc of write and read type and being provided with a first judgement recess which has a first depth to indicate the write and read type, said cartridge of read only type accommodating a magneto optical disc of read only type and being provided with a second judgement recess which has a second depth deeper than the first depth to indicate the read only type, said apparatus comprising:

a base portion having an upper surface;

an optical pickup unit disposed movably on said base portion and having an optical pickup for recording and reproducing the magneto optical disc of the loaded cartridge;

a magnetic head for applying a magnetic field to the magneto optical disc of the loaded cartridge;

a head movement means for holding said magnetic head and moving said magnetic head between a near position and a far position, said near position being a position near the magneto optical disc of the loaded cartridge enough to apply the magnetic field of the magnetic head for recording thereto, said far position being a position too far from the magneto optical disc of the loaded cartridge to apply the magnetic field of the magnetic head for recording thereto;

a switching lever, which is movable fixed on said base portion such that said switching lever reciprocates in directions perpendicular to the upper surface between a non-regulating position to allow said magnetic head to move between the near position and the far position, and a regulating position to regulate the position of said magnetic head at the far position, for pushing up at one portion thereof the head movement means to move said magnetic head to the far position as said switching lever moves perpendicularly away form the upper surface to the regulating position; and a cartridge holder disposed movably on said base portion, for storing and carrying the loaded cartridge in directions toward and away from the upper surface, said switching lever having a protruded portion which is opposed to the cartridge stored in said cartridge holder, said protruded portion of said switching lever being hooked by said first judgement recess of said loaded cartridge and said loaded cartridge pulling down said switching lever by said first judgement recess hooked to said protruded portion toward the upper surface along with a motion of said cartridge holder toward the upper surface to position said switching lever at the non-regulating position if the loaded cartridge is the write and read type, said protruded portion being engaged with said second judgement recess such that said switching lever is not pulled down at the protruded portion by said loaded cartridge at the second judgement recess along with the motion of said cartridge holder toward the upper surface, and said switching lever being positioned at the regulating position if the loaded cartridge is the read only type.

7. An apparatus according to claim 6, further comprising an elastic member through which said switching lever is movably fixed on said base portion for applying an elastic force to said switching lever in a direction away from the upper surface toward the regulating position.

8. An apparatus according to claim 7, wherein said switching lever is moved to be positioned at the non-regulating position by being pulled down at the protruded portion by said loaded cartridge toward the upper surface against the elastic force of said elastic member if the loaded cartridge is the write and read type.

9. An apparatus according to claim 6, further comprising a spring member connected between said head movement means and said base portion for applying a spring force to said head movement means in a direction toward the far position.

10. An apparatus according to claim 6, further comprising:

a support means for supporting and guiding said cartridge holder along the upper surface; and a drive means for driving said support means in the directions toward and away from the upper surface.

* * * * *